No. 733,465. PATENTED JULY 14, 1903.
H. H. DOW.
PROCESS OF OBTAINING AMMONIA FROM AMMONIA CONTAINING GASES.
APPLICATION FILED JULY 23, 1902.
NO MODEL.
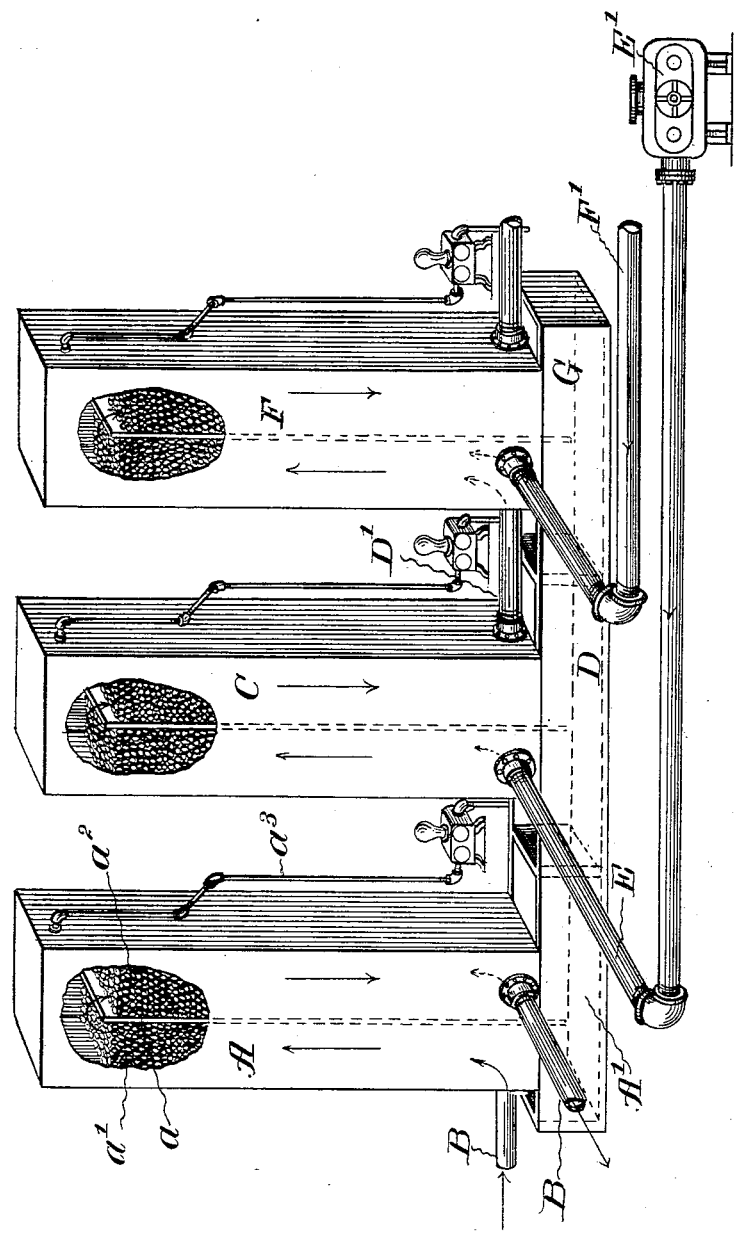

No. 733,465.

Patented July 14, 1903.

UNITED STATES PATENT OFFICE.

HERBERT H. DOW, OF MIDLAND, MICHIGAN.

PROCESS OF OBTAINING AMMONIA FROM AMMONIA-CONTAINING GASES.

SPECIFICATION forming part of Letters Patent No. 733,465, dated July 14, 1903.

Application filed July 23, 1902. Serial No. 116,618. (No specimens.)

*To all whom it may concern:*

Be it known that I, HERBERT H. DOW, a citizen of the United States, and a resident of Midland, county of Midland, and State of Michigan, have invented a new and useful Improvement in Processes of Obtaining Ammonia from Ammonia-Containing Gases, of which the following is a specification, the principle of the invention being herein explained and the best mode in which I have contemplated applying that principle, so as to distinguish it from other inventions.

My invention relates to methods of extracting ammonia from ammonia-containing gases, such as producer-gas, and especially producer-gas made with a great excess of steam, its object being to effect such extraction in an efficient and economical manner. Such invention is particularly adapted for use where natural salt brine or bitter water from natural salt brine is either easily and cheaply obtained or is a waste product. Natural salt brine is a solution containing a complex mixture of chlorids, sulfates, carbonates, and bromids of the alkalies, alkaline-earth metals, and iron, the chlorid of sodium predominating. Bitter water, or "bittern," as it is sometimes referred to, consists of the above-named mixture of compounds with the bulk of the sodium chlorid and the iron removed and the chlorid of calcium predominating. The name is derived from its characteristic bitterness, resulting from the magnesium chlorid present in it.

It has been found that it is commercially impractical to wash ordinary producer-gas to remove all of the tar products. It is therefore impossible to recover ammonium compounds in a pure condition from such gas, such compounds so recovered being always more or less contaminated with tarry material. In the process hereinafter described the ammonium-tar products are collected in solution and a pure ammonium compound made in a subsequent step by means hereinafter explained. The ammonia is then taken out and recovered without recovering the accompanying coloring material.

My invention consists of a series of steps hereinafter fully described, and particularly set forth in the claims.

The annexed drawing and the following description set forth in detail one mode of carrying out the invention, such disclosed mode constituting but one of various ways in which the principle of the invention may be used.

In said annexed drawing the figure represents diagrammatically one form of apparatus which may be used in carrying out my invention.

A tower A is provided with a diaphragm or partition $a$, dividing its interior into two compartments $a'$ and $a^2$, communicating at the top, as shown in the figure. Such two compartments are filled with coke, tile, or other suitable material for comminuting a liquid flowing over it, so as to present a large surface area for contact with a gas. A conduit B discharges the gases from which it is desired to extract the ammonia into one of the compartments $a'$, from whence it flows upwardly through the coke, passes over the partition, and then downwardly through the coke in compartment $a^2$. From the latter compartment it is discharged through a suitable duct B'. Simultaneously with such passage of the gases hot bitter water obtained from natural brine is pumped from a suitable source through a pipe $a^3$ and caused to flow downwardly over the coke in both compartments and discharge into a suitable tank or receptacle A'. On such passage the ammonia in the gases combines with the chlorids of the alkaline earths contained in the solution according to the reaction

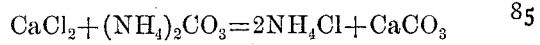

$$CaCl_2 + (NH_4)_2CO_3 = 2NH_4Cl + CaCO_3$$

and is carried downward into tank A'. By absorbing the ammonia in a hot solution, as described, none of the more volatile tar products in the gases of combustion are condensed. Those tar products that are condensed, however, impart color and impurities to the liquor, and the next step in the process has for its object the elimination of these impurities from the $NH_4Cl$. The resultant liquor from tower A is now mixed with an alkaline-earth hydrate, such as calcium hydrate, and is then pumped into the top of a tower C, similar in construction to tower A, through which it flows and is discharged into a tank or receptacle D. The alkaline-earth hydrate added produces the following reaction:

$$2NH_4Cl + Ca(OH)_2 = CaCl_2 + 2NH_4(OH),$$

thus regenerating calcium chlorid, which is used again in tower A for absorbing ammonium carbonates, as before described. During such passage through tower C it is brought into contact with a current of cold air discharged into one compartment of the tower by means of a suitable duct E and blower E', from which it passes upward into the other compartment and is discharged through a conduit D'. The air during its passage blows out and carries with it the ammonia-gas contained in the liquor passing down through the said tower, the ammonium hydrate being decomposed into ammonia and water thus:

$$2NH_4OH + air = 2NH_3 + H_2O.$$

The object of this cold air is to prevent volatilization of such tarry products as were condensed by the hot solution in tower A, since the use of hot air would effect the volatilization of the tarry products contained in the liquor and so contaminate the final product. From the tank or receptacle D the liquor from which the ammonia has been blown out is transferred by suitable means back to the receptacle or tank A' and is used again for the absorption of ammonia, this step resulting in the prevention of loss of both the solution and such small amounts of ammonia as were not removed by the current of air in tower C. From conduit D' the ammonia-laden air is discharged into a tower F, similar in construction to the other two. In this tower it is brought into contact with carbon-dioxid gas, introduced therein through a conduit F' from any suitable source, as a lime-kiln or the products of combustion of any smokeless fire. A solution of bitter water obtained from natural brine is at the same time caused to circulate from a tank G through the tower F. This solution in the presence of the carbon dioxid absorbs the ammonia contained in the air passing through the tower, according to the reaction $$2NH_3 + CO_2 + H_2O + CaCl_2 = 2(NH_4)Cl + CaCO_3$$

or $$(NH_4)_2CO_3 + CaCl_2 = 2NH_4Cl + CaCO_3$$

and when saturated it is removed from tank G and evaporated to such concentration that a large part of the $NH_4Cl$ will crystalize out upon cooling. The mother-liquor, which still contains considerable ammonia, is returned to tower C and mixed with the regular supply from tower A, and a fresh supply of bittern is added to the tower F. By this means the calcium chlorid of the bittern may be used without contaminating the ammonium chlorid with the other constituents of the bittern.

By the words "adding calcium hydrate" or "an alkaline-earth hydrate" is included the addition of the corresponding oxid to the solution which forms the hydrate.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention—

1. The process of recovering ammonia from ammonia-containing gases which consists in bringing such gases into contact with a substance which will combine with the contained ammonia, adding an alkaline-earth hydrate, blowing out the ammonia so liberated with a gas, adding carbon dioxid, and absorbing the ammonia by means of bitter water obtained from a natural brine.

2. The steps in the process of recovering ammonia from ammonia-containing gases which consist in bringing such gases into intimate contact with a solution containing the chlorid of an alkaline earth, adding an alkaline-earth hydrate, and blowing out the ammonia so liberated with a gas.

3. The steps in the process of recovering ammonia from ammonia-containing gases which consist in bringing such gases into intimate contact with a solution containing the chlorid of an alkaline earth, adding calcium hydrate and blowing out the ammonia so liberated with a gas.

4. The steps in the process of recovering ammonia from ammonia-containing gases which consist in bringing such gases into intimate contact with a hot solution containing the chlorid of an alkaline earth, adding an alkaline-earth hydrate, and blowing out the ammonia so liberated with a gas.

5. The steps in the process of recovering ammonia from ammonia-containing gases which consist in bringing such gases into intimate contact with a hot solution containing the chlorid of an alkaline earth, adding calcium hydrate and blowing out the ammonia so liberated with a gas.

6. The steps in the process of recovering ammonia from ammonia-containing gases which consist in bringing such gases into intimate contact with a solution containing the chlorid of an alkaline earth, adding calcium hydrate and blowing out the ammonia so liberated with a gas at a lower temperature than that at which absorption took place.

7. The steps in the process of recovering ammonia from ammonia-containing gases which consist in bringing such gases into intimate contact with a hot solution containing the chlorid of an alkaline earth, adding an alkaline-earth hydrate, and blowing out the ammonia so liberated with a relatively cold gas.

8. The steps in the process of recovering ammonia from ammonia-containing gases which consist in bringing such gases into intimate contact with a solution containing the chlorid of an alkaline earth, adding an alkaline-earth hydrate, and blowing out the ammonia so liberated with a cold gas.

9. The steps in the process of recovering ammonia from ammonia-containing gases which consist in bringing such gases into intimate contact with a hot solution containing the chlorid of an alkaline earth, adding calcium hydrate and blowing out the ammonia so liberated with a cold gas.

10. The steps in the process for recovering ammonia from ammonia-containing gases, which consist in bringing such gases into intimate contact with a solution containing the chlorid of an alkaline earth, adding an alkaline-earth hydrate, blowing out the ammonia so liberated with a gas and adding carbon dioxid to the gaseous mixture so obtained.

11. The process of recovering ammonia from ammonia-containing gases which consists in bringing such gases into intimate contact with a solution containing the chlorid of an alkaline earth, adding an alkaline-earth hydrate, blowing out the ammonia so liberated with a gas, adding carbon dioxid to the mixture so formed, then bringing the resultant mixture into contact with a solution containing the chlorid of an alkaline earth.

12. In a process of recovering ammonia from ammonia-containing fuel-gases, the steps which consist in forming a liquid ammonium compound by bringing said gases into contact with bitter water obtained from natural brine, which water is hot thereby preventing at the same time the condensation of the more volatile tar products contained in said gases, then forming ammonium hydrate by adding an alkaline-earth hydrate, and at the same time preventing the volatilization of the tar products condensed in the first-described step by bringing a cold gas into contact with the tar products.

13. In a process of recovering ammonia from ammonia-containing fuel-gases, the steps which consist in first forming a liquid ammonium compound at a temperature such as to prevent condensation of the more volatile tar products in the gases by bringing said gases into contact with hot bitter water obtained from natural brine, then forming ammonium hydrate by adding an alkaline-earth hydrate at a lower temperature so that volatilization of the remaining tar products in such gases is prevented.

14. In a process of recovering ammonia from ammonia-containing fuel-gases, the steps which consist in first forming ammonium chlorid at a temperature such as to prevent condensation of the more volatile tar products in said gases by bringing said gases into contact with hot bitter water obtained from natural brine, then forming ammonium hydrate by adding an alkaline-earth hydrate at a lower temperature so that volatilization of the remaining tar products in such gases is prevented.

15. In a process of recovering ammonia from ammonia-containing fuel-gases, the steps which consist in first bringing said gases into contact with an alkaline-earth salt whereby a combination between the ammonia in said gases and said salt is effected, then forming ammonium hydrate by adding an alkaline-earth hydrate and finally blowing out the ammonium hydrate with a gas having a temperature less than that required to volatilize the tar products contained therein.

16. In a process of recovering ammonia from ammonia-containing fuel-gases, the steps which consist in first treating the gases to the action of a hot solution of calcium chlorid and then treating the ammonium chlorid so formed to the action of an alkaline hydrate at a temperature less than that required to volatilize the tar products contained therein.

17. In a process of recovering ammonia from ammonia-containing fuel-gases, the steps which consist in first treating such gases to the action of a hot solution of calcium chlorid and then treating the ammonium chlorid so formed to the action of calcium hydrate at a temperature less than that required to volatilize the tar products contained therein.

18. In a process of recovering ammonia from ammonia-containing fuel-gases the steps which consist, in treating the gases to the action of the chlorid of an alkaline earth that is hot whereby the more volatile tar products contained in said gases are volatilized, and then forming a volatile ammonium product by the addition of an alkaline-earth hydrate.

19. In a process of recovering ammonia from ammonia-containing fuel-gases, the steps which consist in first treating such gases to the action of a hot solution of calcium chlorid and then treating the ammonium chlorid so formed to the action of an alkaline-earth hydrate, and then blowing out the ammonia so formed at a temperature less than that required to volatilize the tar products contained therein.

20. The process of recovering ammonia from ammonia-containing fuel-gases which consists in bringing such gases into contact with a substance that will combine with the contained ammonia, at the same time preventing condensation of the non-volatile tar products by having such combining substance hot, adding an alkaline-earth hydrate, and then blowing out the ammonia so formed with a gas at a temperature less than that required to volatilize the tar products contained in said gases.

Signed by me this 24th day of June, 1902.

HERBERT H. DOW.

Attest:
D. T. DAVIES,
GEO. W. SAYWELL.